US012330282B2

(12) United States Patent
Lefavour et al.

(10) Patent No.: US 12,330,282 B2
(45) **Date of Patent: *Jun. 17, 2025**

(54) FORCE ADJUSTING POWER TOOL WITH INTERCHANGEABLE HEAD

(71) Applicant: Hubbell Incorporated, Shelton, CT (US)

(72) Inventors: John David Lefavour, Litchfield, NH (US); Daniel Paul Owens, Brookline, NH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,501

(22) Filed: Jan. 23, 2024

(65) Prior Publication Data

US 2024/0181619 A1 Jun. 6, 2024

Related U.S. Application Data

(63) Continuation of application No. 16/201,514, filed on Nov. 27, 2018, now Pat. No. 11,911,888.

(60) Provisional application No. 62/591,484, filed on Nov. 28, 2017.

(51) Int. Cl.
*B25F 3/00* (2006.01)
*B25F 5/00* (2006.01)

(52) U.S. Cl.
CPC ................ *B25F 3/00* (2013.01); *B25F 5/005* (2013.01)

(58) Field of Classification Search
CPC .......... B25F 3/00; B25F 5/005; B25B 27/026; B25B 27/10; B21D 39/04; B21D 39/046
See application file for complete search history.

(56) References Cited

U.S. PATENT DOCUMENTS

| | | | | |
|---|---|---|---|---|
| 3,973,179 A * | 8/1976 | Weber | H01M 50/204 | 200/332.2 |
| 5,003,847 A * | 4/1991 | Wagner | B25B 23/145 | 81/57.39 |
| 5,195,042 A * | 3/1993 | Ferraro | H01R 43/0427 | 29/863 |
| 6,000,888 A | 12/1999 | Hartman | | |
| 6,039,126 A | 3/2000 | Hsieh | | |

(Continued)

FOREIGN PATENT DOCUMENTS

| | | |
|---|---|---|
| EP | 2079562 | 7/2009 |
| GB | 2375981 | 12/2002 |

OTHER PUBLICATIONS

International Search Report and Written Opinion mailed in PCT/US2018/062614 on Feb. 8, 2019.

(Continued)

*Primary Examiner* — Thomas M Wittenschlaeger
*Assistant Examiner* — Katie L Gerth
(74) *Attorney, Agent, or Firm* — Wissing Miller LLP

(57) ABSTRACT

Portable, hand held, battery operated, hydraulic tools are provided with a tool frame and one or more interchangeable working heads. When the working head is connected with the tool frame, a piston actuated by a hydraulic system within the tool frame applies force to the working head to perform a task. The tool includes a sensor for detecting the type of head connected with the tool and a mechanism for adjusting the amount of force applied to the head by the hydraulic system based on the detected head type.

19 Claims, 7 Drawing Sheets

(56) References Cited

U.S. PATENT DOCUMENTS

| | | | | |
|---|---|---|---|---|
| 6,170,579 | B1 | 1/2001 | Wadge | |
| 6,178,870 | B1 | 1/2001 | Takahashi | |
| 9,573,263 | B2 * | 2/2017 | Bowles | B25F 5/005 |
| 2002/0050368 | A1 * | 5/2002 | Driessen | B25F 3/00 173/217 |
| 2002/0148274 | A1 | 10/2002 | Goop | |
| 2007/0295053 | A1 | 12/2007 | Ruland | |
| 2008/0302549 | A1 * | 12/2008 | Zeiler | B23Q 17/0985 408/239 R |
| 2011/0203819 | A1 | 8/2011 | Tsai | |
| 2011/0272172 | A1 | 11/2011 | Lau et al. | |
| 2012/0284981 | A1 | 11/2012 | Bungter | |
| 2012/0319398 | A1 | 12/2012 | Schweizer et al. | |
| 2013/0008677 | A1 | 1/2013 | Huifu | |
| 2013/0240228 | A1 * | 9/2013 | Lefavour | B21D 39/048 173/20 |
| 2013/0264085 | A1 | 10/2013 | Ciotti | |
| 2014/0047885 | A1 | 2/2014 | Battenfeld et al. | |
| 2014/0110456 | A1 * | 4/2014 | Taylor | A61B 90/90 227/176.1 |
| 2014/0332243 | A1 | 11/2014 | Baskar et al. | |
| 2015/0059529 | A1 | 3/2015 | Franken | |
| 2015/0272569 | A1 * | 10/2015 | Leimbach | B25F 5/00 227/175.1 |
| 2015/0343583 | A1 | 12/2015 | McRoberts et al. | |
| 2016/0167186 | A1 * | 6/2016 | Chan | G05B 19/4185 173/2 |
| 2016/0252112 | A1 | 9/2016 | Kehoe et al. | |
| 2016/0363510 | A1 | 12/2016 | Kunack | |
| 2017/0057040 | A1 | 3/2017 | Rzasa et al. | |
| 2017/0087709 | A1 | 3/2017 | Barezzani | |
| 2017/0302044 | A1 | 10/2017 | Lefavour et al. | |

OTHER PUBLICATIONS

Emerson Brochure for RIDGID "Electrician and Utility Tools", pp. 1-27, 2018.

Emerson Manual for Electrical Tools RE 6/RE 60.RE 600; pp. 1-90, Dec. 2017.

International Preliminary Report on Patentability mailed in PCT/US2018/062614 on Jun. 2, 2020.

Communication pursuant to Rules 70(2) and 70a(2) EPC mailed in corresponding EP 18883995.5 mailed Dec. 9, 2021 (10 pages).

* cited by examiner

FORCE ADJUSTING POWER TOOL WITH INTERCHANGEABLE HEAD

CROSS-REFERENCE TO RELATED APPLICATIONS

This application is a continuation of and claims priority to U.S. patent application Ser. No. 16/201,514 filed Nov. 27, 2018 which claims priority under 35 U.S.C. § 119 to U.S. Provisional Patent Application No. 62/591,484, filed on Nov. 28, 2017, the disclosures of which are incorporated herein in their entirety by reference.

TECHNICAL FIELD

The present disclosure relates to power tools that can adjust the force they exert on a workpiece and, more particularly, to portable, hand-held power tools with interchangeable heads that can detect the type of attached head and adjust the force exerted accordingly.

DESCRIPTION OF THE RELATED ART

Portable, handheld power tools are used to perform a variety of tasks. Such tools include a power source such as a battery, an electric motor, and a working component, such as a saw, cutting blade, grinding wheel, or crimper. Some portable tools incorporate a hydraulic pump to drive a piston to apply a relatively large amount of force or pressure for a particular task. Some of these hydraulic tools include a working head with working surfaces shaped to perform a particular action on a workpiece, for example, crimping or cutting. Force from the piston actuated by the hydraulic system is applied to the workpiece to perform the desired task.

Battery powered hydraulic tools are employed in numerous applications to provide an operator with a desired flexibility and mechanical advantage. For example, an operator of a hydraulic power tool equipped with a head having a cutting blade can cut large conductors e.g., #8 conductors and larger. Likewise, an operator using a hydraulic tool equipped with a head including crimping surfaces can use the tool to make crimped connections on large conductors.

Many hydraulic tools require relatively expensive components to provide sufficient power, durability, and reliability for industrial and commercial tasks. Such tools may also require strong components to withstand significant forces required to perform industrial processes. Thus, such tools may be expensive, heavy, and bulky.

Hydraulic tools may be specialized to perform different tasks. The shape and materials forming the workpiece may differ depending on the task. Different working surfaces provided on the head of the tool may be required to shape the workpiece into the desired configuration. In addition, different dies may be attached to the head to accomplish particular tasks, e.g., deforming a particular crimp or lug connector onto a conductor to create a reliable mechanical and electrical connection. Moreover, the shape and configuration of the head or the die may differ depending on the metal (for example, copper or aluminum) forming the conductor.

Hydraulic power tools are designed to apply a particular force to perform a particular task. A tool might be designed to provide 4, 6, 11, 12, or 15 short tons of force. The force appropriate for a task may depend on such factors as the size of the conductor, whether the conductor is being cut or connected via a crimp or lug connector, the type of crimp or lug connector, the size of the conductor, and the metal forming the conductor (e.g. aluminum or copper). Generally, the amount of force applied by a hydraulic tool is fixed by the design of the tool.

Because hydraulic power tools are designed to apply a fixed amount of force, a different power tool may be required to perform different tasks. Where a job requires multiple kinds of operations, an installer may need to carry a number of different tools, each configured to provide the correct amount of force to accomplish a particular task. This may be expensive. Where a jobsite is difficult to access, carrying multiple tools may be inconvenient.

SUMMARY OF THE INVENTION

The present disclosure provides exemplary embodiments of hydraulic power tools with a tool frame that can be connected with interchangeable heads. Such tools allow an operator to change the function of a single tool frame so the same tool frame can perform a variety of different tasks. This may reduce the expense required to equip the user because a single tool frame can be joined with different working heads to perform different tasks. Using interchangeable working heads on a single tool frame may also reduce the weight and bulk of the equipment a user must bring to the job site.

The present disclosure also provides exemplary embodiments for a hydraulic power tool where the force applied to deform a workpiece is adjusted, depending on the configuration of the working head, as well as the configuration of dies forming the working surfaces that shape the workpiece.

The present disclosure also provides exemplary embodiments for a hydraulic power tool that automatically detects the configuration of the interchangeable head connected with the tool, determines the amount of force appropriate for that head, and alters the operation of the hydraulic system to apply the appropriate force.

The present disclosure also provides exemplary embodiments for a hydraulic power tool that detects the type of die connected with the working head and adjusts the force applied by the hydraulic system based on the type of die.

The present disclosure also provides exemplary embodiments for a hydraulic power tool for installing connectors, such as crimp connectors and lug connectors, that detects the type of connector and adjusts the force applied by the hydraulic system based on the connector type.

The present disclosure also provides exemplary embodiments for a hydraulic power tool that allows the installer to identify the metal forming the conductor being connected and adjusts the force applied by the hydraulic system based on the conductor metal.

According to one aspect of the disclosure there is provided a hydraulic tool comprising a working head, the working head comprising indicia that identify a type of the working head from a plurality of types, a tool frame having a piston, a hydraulic system coupled to piston, a coupling mechanism, the coupling mechanism releasably coupling the head to the frame, and a head sensor, the head sensor being adapted to detect the indicia, and a controller connected with the head sensor and the hydraulic system, wherein the controller receives a signal generated by the head sensor in response to the indicia, determines the type of the head, determines a force to apply based at least in part on the determined head type, and controls the hydraulic system to apply the identified force.

According to a further aspect of the disclosure, the tool further comprises a die, the die comprising indicia that identify a type of the die from a plurality of die types, and a die sensor connected with the controller, wherein the die sensor communicates information identifying the type of the die based on the indicia to the controller, and wherein the controller determines the force based at least in part on the determined die type.

According to a further aspect of the disclosure, the tool further comprises a connector sensor in communication with the controller, the connector sensor adapted to read an indicia of a connector indicating a type of the connector from a plurality of connector types, wherein the controller determines the force based at least in part on the determined connector type.

According to a further aspect of the disclosure, the tool further comprises an input device connected with the controller, the input device adapted to receive an input indicating a characteristic of a workpiece such as the metal forming a conductor that is part of the workpiece, and wherein the controller determines the force based at least in part on the characteristic. [Confirm finalized claims added to summary]

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Illustrative embodiments of the present disclosure may be provided as improvements to portable, hand held, battery operated, hydraulic tools and one or more interchangeable working heads for performing different tasks where the force applied by the tool is adjusted based on factors including the type of working head, the type of die fitted to the working head, the type of connectors to be installed on a conductor, and the type of metal forming the conductor.

Figure 1:
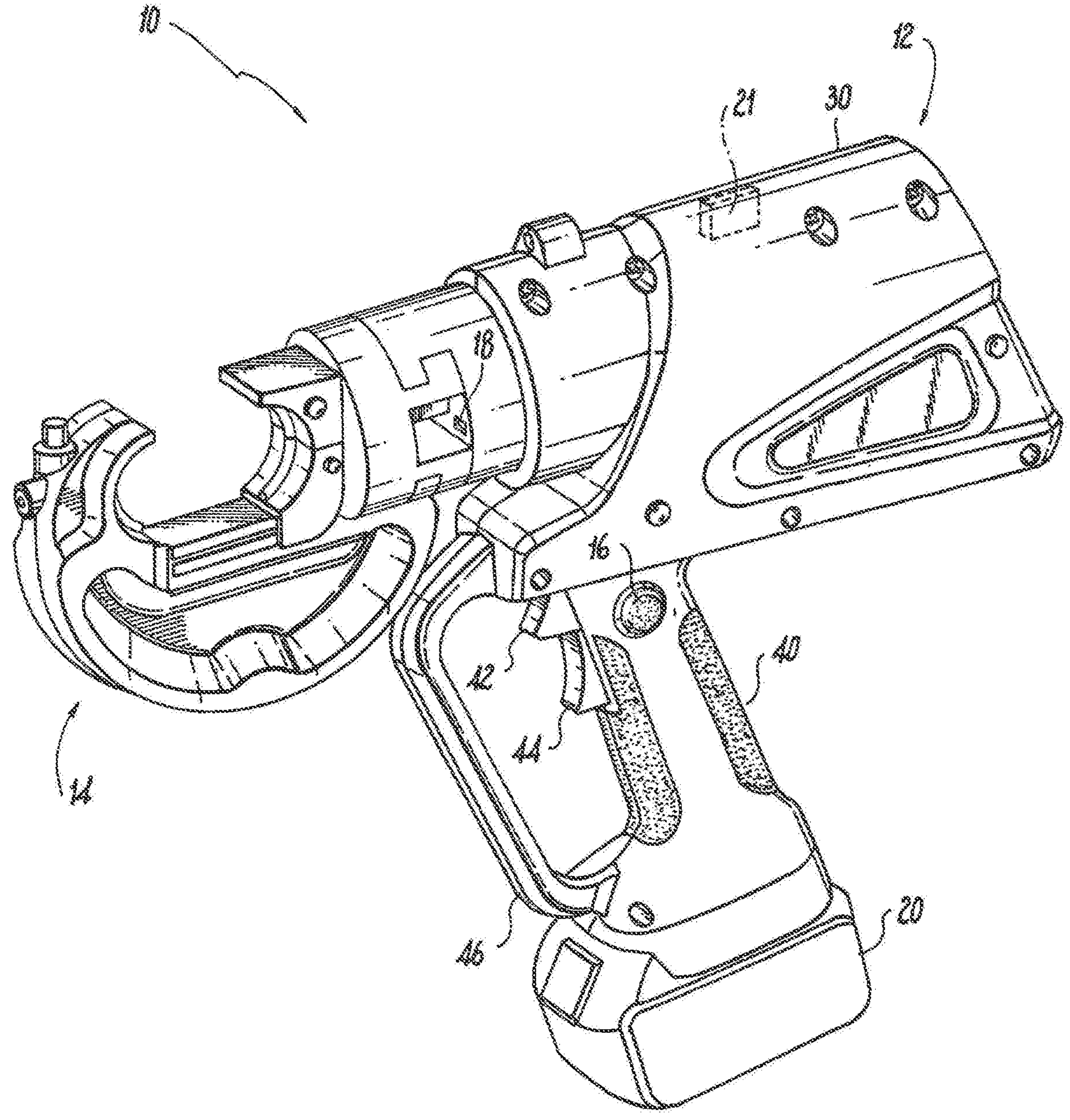
FIG. 1 is a front perspective view of an exemplary embodiment of a tool according to the present disclosure illustrating a tool frame connected with a working head of the tool.

FIG. 1 show an exemplary embodiment of a hydraulic power tool 10 according to the present disclosure. The tool 10 includes a tool frame 12 and a working head 14. Within the frame 12 is a battery driven hydraulic system 11 illustrated schematically in FIG. 2. Battery 20 provides electrical power to the hydraulic system. The tool frame 12 includes a main body 30 and a handle 40 that form a pistol-like shape. However, the tool frame 12 could be in any suitable type of shape.

Figure 3:
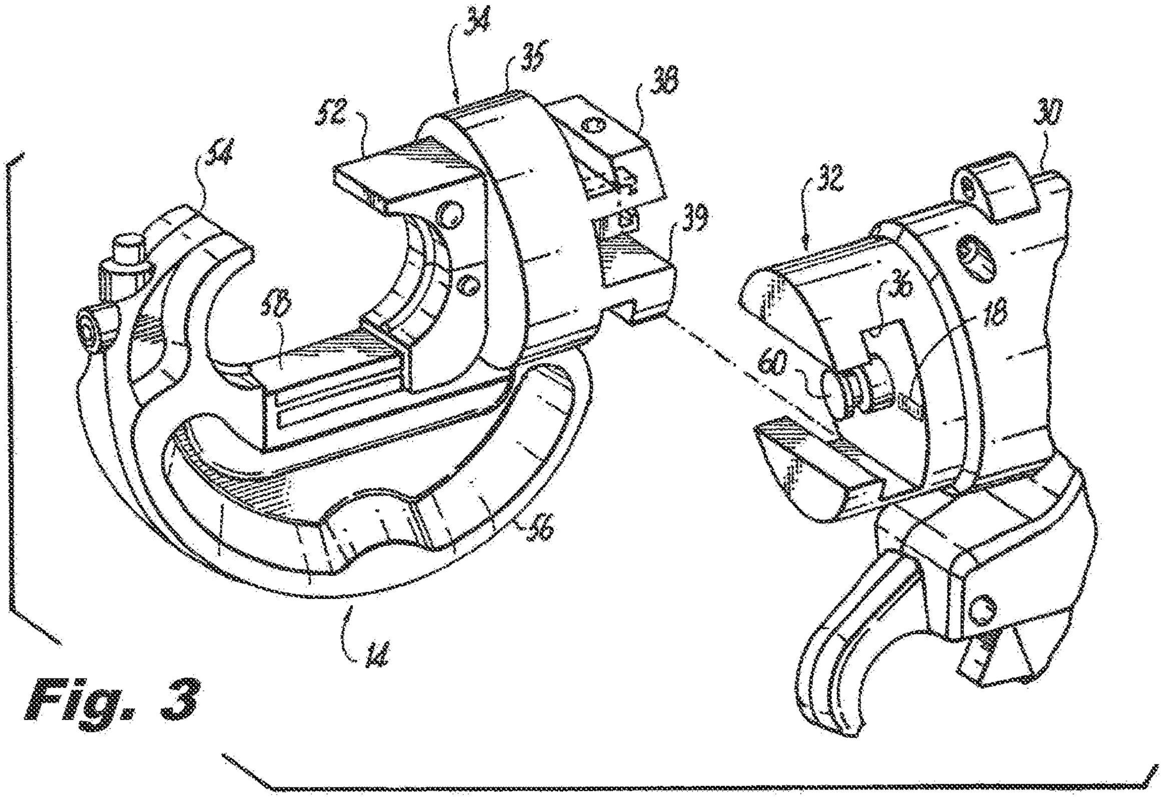
FIG. 3 is a front perspective view of the working head and a portion of the main body of the embodiment of FIG. 1, illustrating the working head separate from the tool frame.
Figure 4:
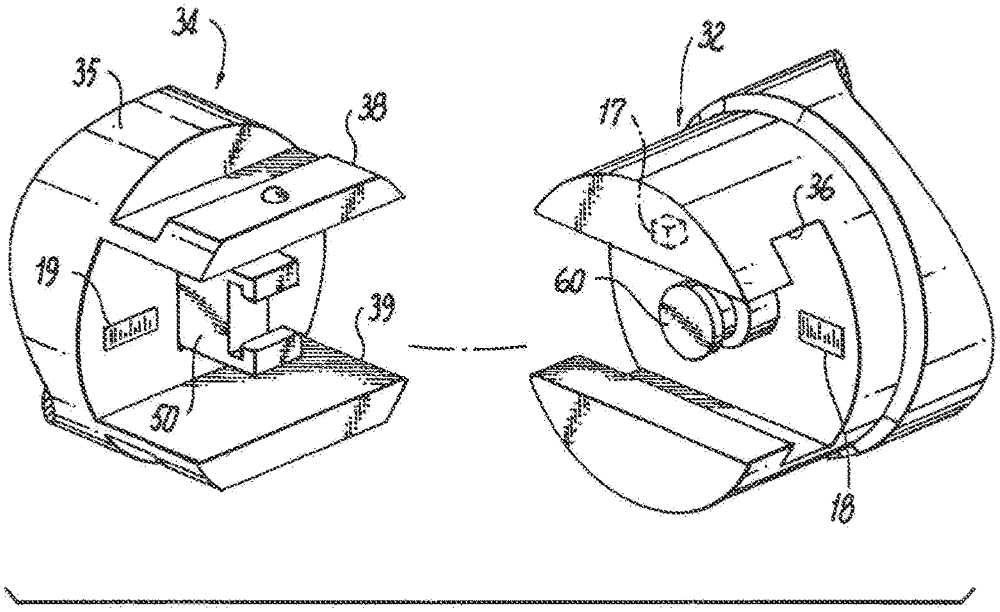
FIG. 4 is a perspective view of the embodiment of FIG. 3 illustrating sensors and indicia according to further embodiments of the disclosure.
Figure 5:
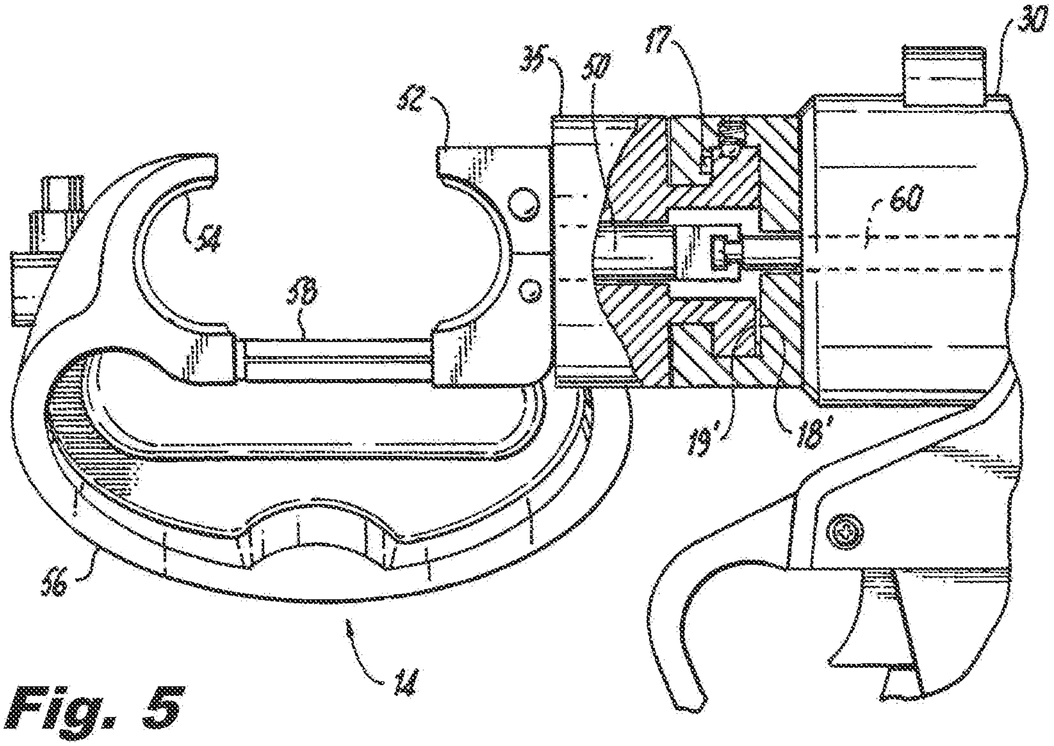
FIG. 5 is a side elevation view of the working head and cross section of a portion of the main body of the embodiment of FIG. 1 with the tool in a home position.
Figure 6:
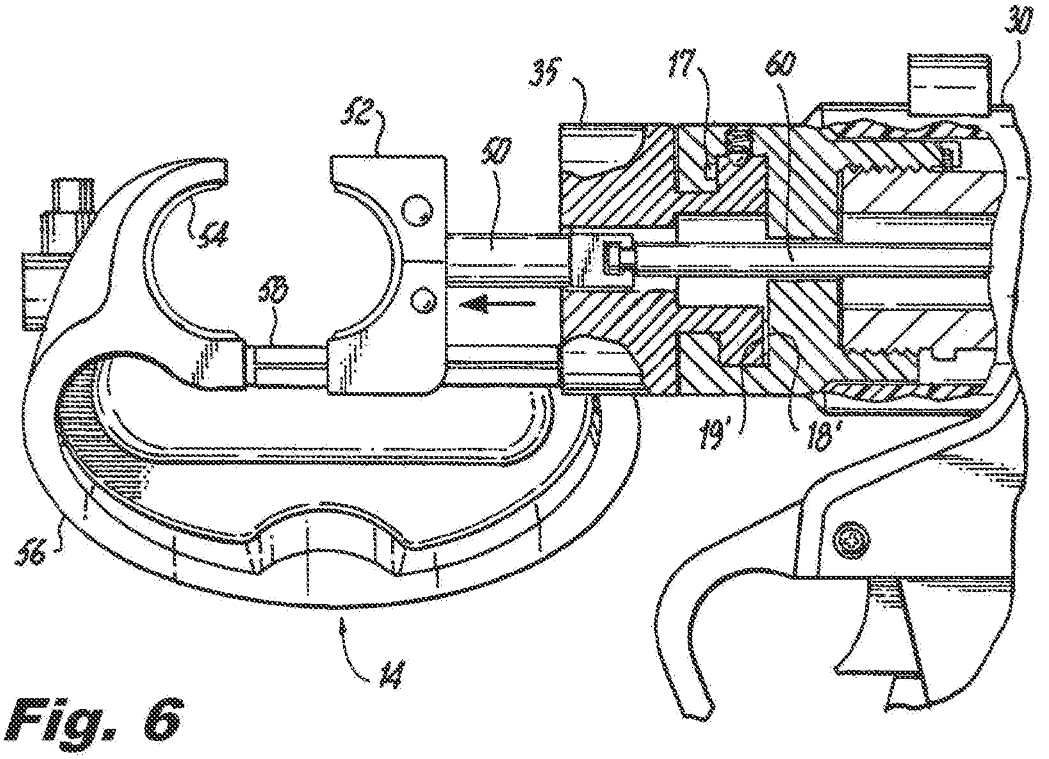
FIG. 6 is a side elevation view of the working head and cross section of a portion of the main body of the embodiment of FIG. 1 with the tool in an actuated position.

FIG. 3 shows head 14 separated from main body 30. Head 14 and main body 30 engage together as shown by the dotted line in FIG. 3. Head 14 includes a head connecting portion 34 that engages with tool connecting portion 32 on main body 30. FIG. 4 shows the facing surfaces of tool connecting portion 32 and head connecting portion 34. FIGS. 5 and 6 show a partial cross section of head 14 connected with main body 30.

Head 14 includes an impactor 52 that connects with piston 60 via drive shaft 50. Impactor 52 engages with a guide 58 on arm 56. When the working head 14 is connected to the main body 30 and the piston 60 is driven in the distal direction, drive shaft 50 forces the impactor 52 along guide 58, as shown in FIG. 6. Arm 56 is connected at its proximal end with the ring 35. At its distal end, arm 56 supports an anvil surface 54. When a workpiece is placed between the impactor 52 and anvil surface 54 and the piston 60 is driven in the distal direction, the impactor 52 and anvil 54 deform the workpiece.

Figure 11:
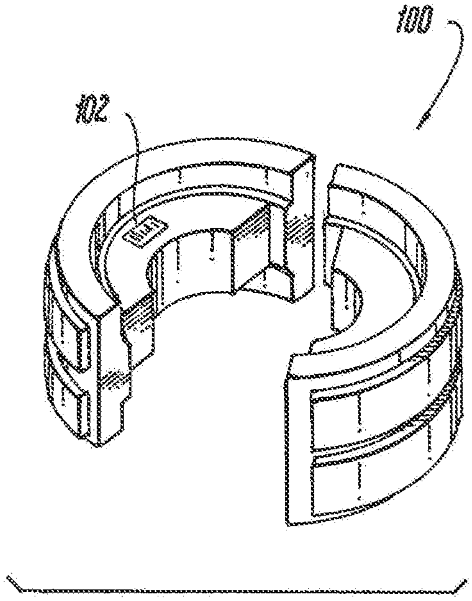
FIGS. 11, 12, and 13 are perspective views of dies according to an embodiment of the disclosure.
Figure 12:
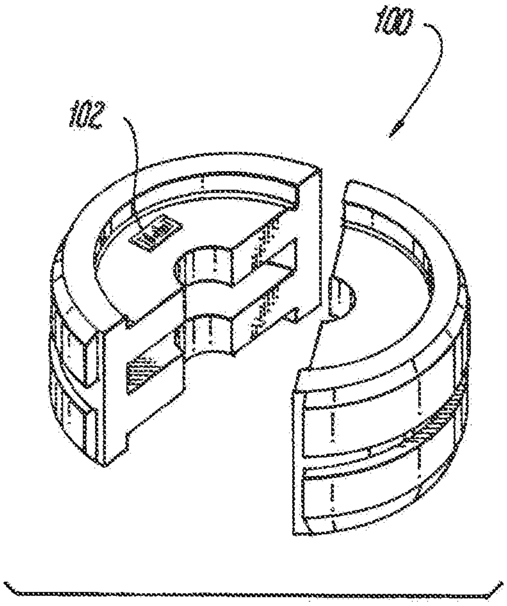
Figure 13:
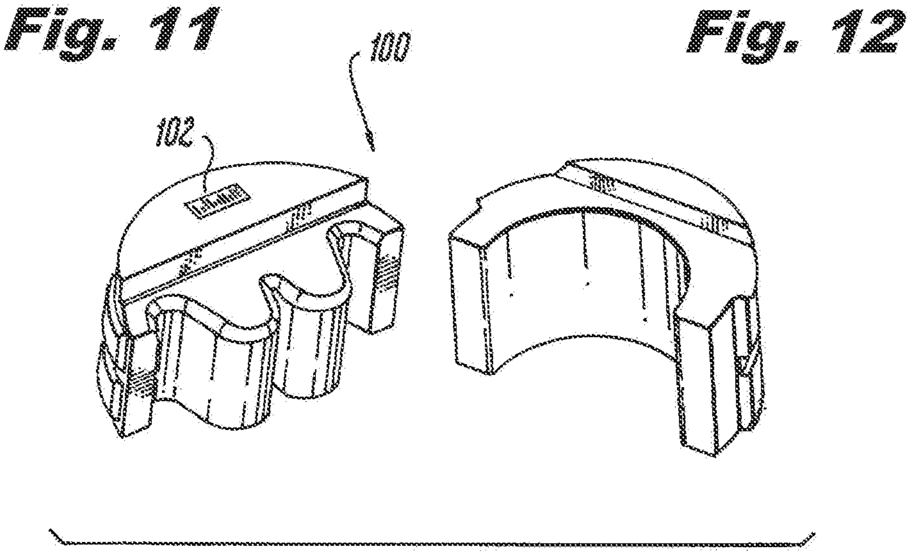
Figure 15:
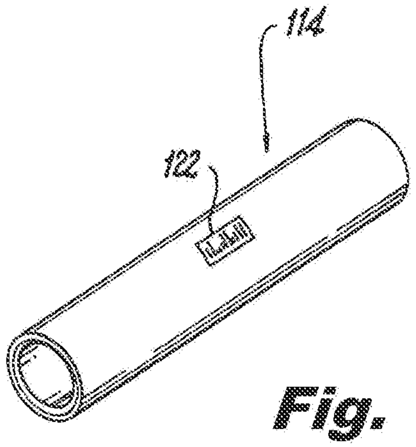
FIG. 15 is a perspective view of a splice connector according to an embodiment of the disclosure.

Impactor 52 and/or anvil 54 may also include surface features that allow a die, such as those shown in FIGS. 11, 12, and 13 to be connected. The die forms working surfaces to shape the workpiece into a desired configuration. For example, to splice two conductors together, a crimp connector, such as the one shown in FIG. 15 is fitted onto the ends of the conductors. A die, such one shown in FIG. 12, is selected that will shape the finished crimp so that both conductors are securely connected. The die is fitted onto impactor 52 and anvil 54. The crimp connector with the conductor ends inserted is placed between the die surfaces. The tool is actuated, compressing the crimp connector between the die surfaces to form the finished splice.

Main body 30 has a head sensor 18 on the tool connecting portion 32 facing the head 14 as shown in FIG. 4. Head sensor 18 may be a bar code reader or other device designed to inspect indicia 19 on a facing surface of head 14, as will be explained in more detail below. As shown in FIG. 1, die/connector sensor 21 is located on another surface of main body 30. Die/connector sensor 21 may also be a barcode reader or other device for inspecting indicia of a die or connector that will be used to perform a task, as will be described more fully below.

The handle 40 includes one or more operator controls, such as trigger switches 42 and 44, and pushbutton 16 which can be manually activated by an operator. The handle 40 may include a hand guard 46 to protect an operator's hand while operating the tool 10 and to prevent unintended operation of trigger switches 42 and 44. According to an embodiment of the present disclosure, one of the trigger switches (e.g., trigger switch 42) may be used to activate the hydraulic system 11 to pressurize hydraulic drive 28 to drive the piston 60 in the distal direction as shown by the arrow in FIG. 6 to deliver force to the working head to perform a task, such as crimping or cutting. The other trigger switch (e.g., trigger switch 44) may be used to cause the hydraulic system to depressurize hydraulic drive 28 to retract the piston 60 in the proximal direction to the home position shown in FIG. 5. Pushbutton 16 is provided on the handle 40. As will be explained below, pushbutton 16 allows a user to actuate the die/connector sensor 21 and also to communicate other information to the tool 10 such as the type of metal forming a workpiece.

The battery 20 is removably connected to the bottom of the handle 40. In another embodiment, the battery 20 could be removably mounted or connected to any suitable position on the tool frame 12. In another embodiment, the battery 20 may be affixed to the tool 10 so that it is not removable. The battery 20 is preferably a rechargeable battery, such as a lithium ion battery, that can output a voltage of at least 16 VDC, and preferably in the range of between about 16 VDC and about 24 VDC. In the exemplary embodiment shown in FIG. 1, the battery 20 can output a voltage of about 18 VDC.

Figure 2:
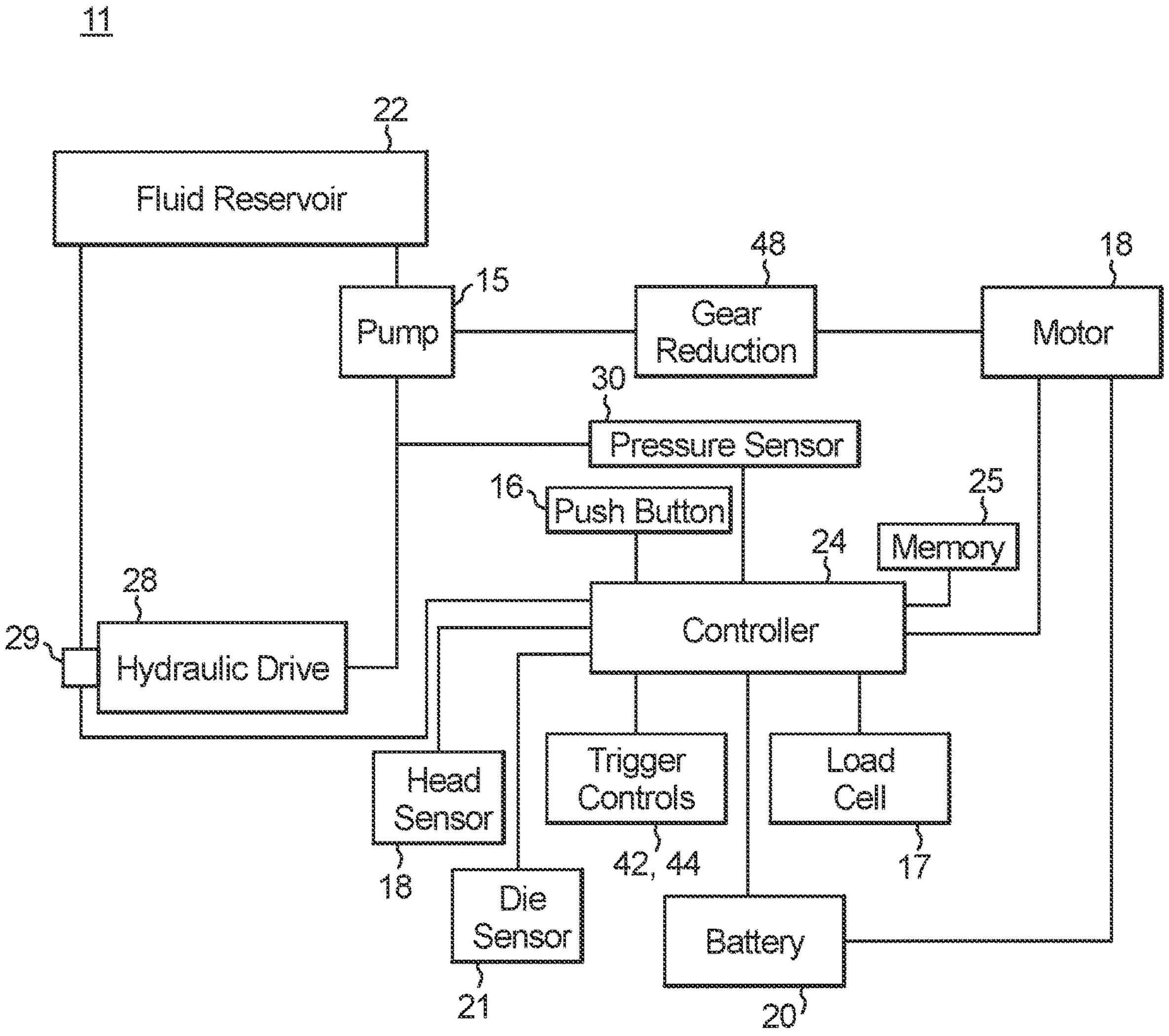
FIG. 2 is a schematic diagram illustrating a hydraulic drive system according to an embodiment of the disclosure.

FIG. 2 shows a schematic of the hydraulic system 11. Battery 20 provides power to controller 24. Battery 20 also provides power to motor 18 under the control of controller 24. Motor 18 drives pump 15 via gear reduction 48. Pump 15 is in fluid connection with a hydraulic fluid reservoir 22. When driven by motor 18, pump 15 delivers fluid under pressure from reservoir 22 to hydraulic drive 28. Force generated by hydraulic drive 28 is delivered via piston 60 to head 14 and applied to deform a workpiece, as shown in FIGS. 5 and 6. Pressure sensor 30 is connected with hydraulic drive 28 and senses the hydraulic pressure in hydraulic drive 28. Controller 24 receives data indicating the pressure in hydraulic drive 28 from pressure sensor 30 and computes a force applied by piston 60 as a function of the pressure.

Relief valve 29 connects hydraulic cylinder 28 with fluid reservoir 22. Relief valve 29 can be opened and closed by controller 24. When relief valve 29 is opened, fluid flows back to reservoir 22 relieving pressure in hydraulic drive 28 and removing the force applied on the workpiece. A spring (not shown) may be provided as part of hydraulic drive 28 to return piston 60 to the home position shown in FIG. 5 when pressure in hydraulic drive 28 is relieved.

Controller 24 may be a microprocessor, microcontroller, application specific integrated circuit, field programable gate array (FPGA) or other digital processing apparatus as will be appreciated by those skilled in the relevant art. Controller 24 communicates with memory 25 to receive program instructions and to retrieve data. Memory 25 may be read-only memory (ROM), random access memory (RAM), flash memory, and/or other types of electronic storage know to those of skill in the art. Controller 24 may also communicate with external devices or networks via a port (not shown) such as a USB port or wireless communication interface (e.g., WiFi, Bluetooth, and the like). Memory 25 includes data identifying operating parameters including the proper force to be used with various heads 14, as well as with various dies, connectors, and conductor materials and/or combinations thereof. Such data may be load into and/or updated in memory 25 via the port or interface or may be provided in memory 25 when the tool is assembled.

Controller 24 receives signals from head sensor 18 and/or die/connector sensor 21 and compares those signals with information stored in memory 25 to determine the type of head 14 and/or die connected with main body 30 and to determine the proper force to be applied by hydraulic drive 28. Controller 24 also receives signals from pushbutton 16 to activate die/connector sensor 21 and/or to determine the metal comprising the workpiece, as will be described below. Controller 24 also receives signals from triggers 42, 44 located on handle 40 to activate and deactivate hydraulic drive 28.

Working head 14 is separable from the main body 30. A variety of mechanisms may be provided to removably connect different working heads 14 to main body 30, as set forth in U.S. Provisional Patent Application No. 62/591,313, filed Nov. 28, 2017, now U.S. Pat. No. 11,426,850 issued Aug. 30, 2022 and incorporated herein by reference. According to one embodiment shown in FIG. 3, main body 30 includes tool connecting portion 32. Working head 14 includes head connecting portion 34. Tool connecting portion 32 includes a T-shaped slot 36. The head connecting portion 34 includes upper and lower connecting arms 38, 39 connected with a ring 35. In operation, piston 60 provides force to drive shaft 50 distally to deliver force to a workpiece, as shown in FIG. 6. The cross section of the connecting arms 38, 39 correspond to the cross section of the T-shaped slot 36 so that when the head connecting portion 34 is aligned with the tool connecting portion 32, the arms 38, 39 slide into the T-shaped slot 36, as shown by the dotted line in FIG. 3.

When head 14 is joined with main body 30 head sensor 18 is positioned facing indicia 19 on head 14. Sensor 18 may be a barcode scanner, such as the MT80 Mini Scan Engine manufactured by Marson Technology Co., Ltd. Indicia 19 may be an adhesive label, etched surface, or painted area of head 14 that includes a barcode such as a UPC code. Sensor 18 collects identifying information about head 14 and communicates it to controller 24. According to the embodiment shown in FIGS. 1, 3, and 4, a gap between the location of sensor 18 and barcode 19 is provided to allow sensor 18 a sufficient angular field of view to read the barcode 19. Such a gap may be formed by recessing sensor 18 below the surface of main body 30. According to another embodiment, instead of a bar code, indicia 19 include alphanumeric characters, for example, a model name of the head. Sensor 18 includes a camera equipped with character recognition software to identify the type of head based on the alphanumeric characters.

According to one embodiment, memory 25 includes a look-up table including operating parameters for a variety of heads 14. Controller 24 compares the data from sensor 18 with records on the look-up table to determine the correct force to apply. According to another embodiment, instead of a look-up table, controller 24 uses an algorithm to determine a correct force to apply based on the type of head. The sensor 18 may be activated by controller 24 when trigger 42 is pressed to identify the type of head 14.

In operation, a user selects head 14 from among a variety of heads 14 to perform a particular task, for example, installing a crimp connector to splice together two conductors. The user arranges tool 10 along with the crimp connector, such as the one shown in FIG. 15, and conductors to be spliced so that the conductors are inserted into the ends of the connector and the connector is positioned between the faces of the tool. The user actuates the hydraulic system 11 by pressing trigger 42. Controller 24 activates sensor 18 to detect the type of head 14 and identifies the proper force to apply for the type of head 14 identified based on data stored in memory 25. Controller turns on motor 18, causing pump 15 to pressurize hydraulic drive 28. Piston 60 delivers force to head 14, deforming the crimp around the conductors, forming the splice. Controller 24 monitors pressure in hydraulic drive 28 detected by pressure sensor 30. When controller 24 determines that the detected pressure corresponds to the proper force to apply, based on the identified type of head 14, controller turns off motor 18 and opens relief valve 29, depressurizing hydraulic drive 28, thus removing the force applied to the workpiece.

Figure 7:
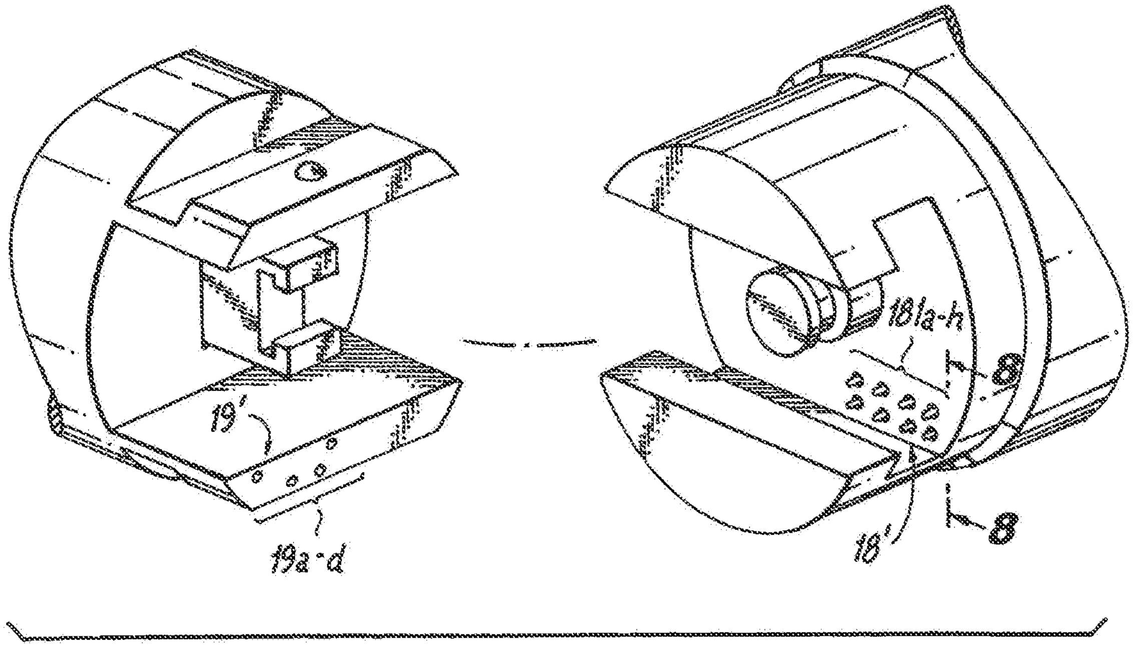
FIG. 7 is a perspective view of a portion of a working head and a tool frame, illustrating the working head separate from the tool frame and showing a sensor and indicia according to a further embodiment of the disclosure.
Figure 8:
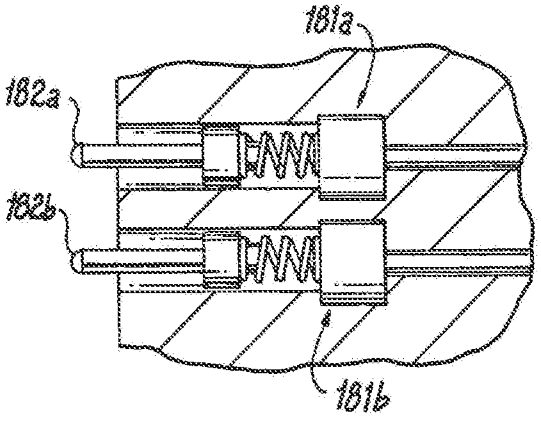
FIG. 8 is a cross sectional view of a portion of the sensor according to the embodiment of FIG. 7.

Instead of or in addition to a barcode reader, sensor 18 may be a contact-type sensor 18' that determines the type of head 14 based on features on the corresponding surface of the head 14 as shown in FIGS. 7 and 8. As shown in FIG. 7, sensor 18' consists of an array of mechanical switches 181*a-h*. Two of such switches 181*a* and 181*b* are illustrated in cross section in FIG. 8. The switches are actuated by corresponding spring-driven pins 182*a-h*. Head 14 includes indicia 19' in the form of an array of holes 191*a-d*. When head 14 is installed on main body 30, the spring driven pins 182*a-h* are pressed against indicia 19' on the surface of head connecting portion 34. Certain of the pins 182*a-h* engage with holes 191*a, b, c, d*, actuating corresponding switches 181*a-h*. The number and location of holes 191*a, b, c, d* is varied, depending on the type of head 14. Switches 181*a-h* are electrically connected with controller 24. Eight switches 181*a-h* and four holes 191*a, b, c, d* are shown in FIG. 7 for illustrative purposes, but more or fewer switches and holes could be provided.

FIG. 5 is a cross section showing head 14 engaged with main body 30. Sensor 18' is located on tool connecting portion 32. Indicia 19' are located on head connecting portion 34 adjacent sensor 18'. Pins 182*a-h* engage with holes forming the indicia 19'. Output from the switches is communicated as data to controller 24. The combination of actuated switches is decoded by controller 24 to identify the type of head 14. Controller 24 determines from the look-up table in memory 25 the proper parameters to use with that type of head, including the correct force to apply.

Figure 9:
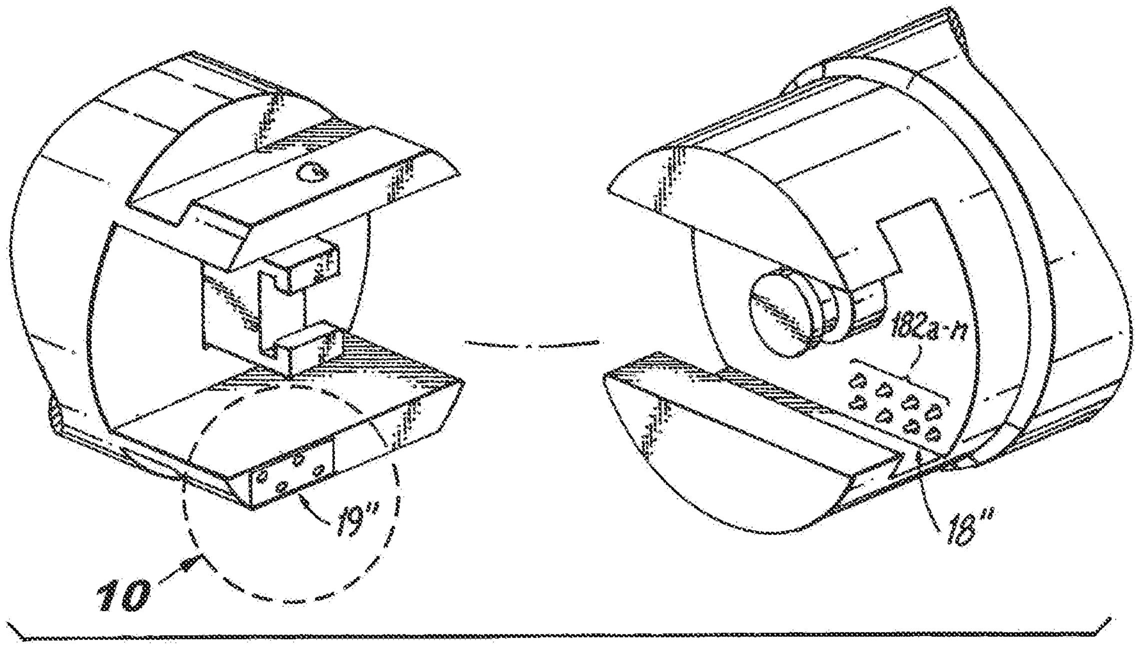
FIG. 9 is a perspective view of a portion of a working head and a tool frame, illustrating the working head separate from the tool frame and showing sensors and indicia according to a further embodiment of the disclosure.
Figure 10:
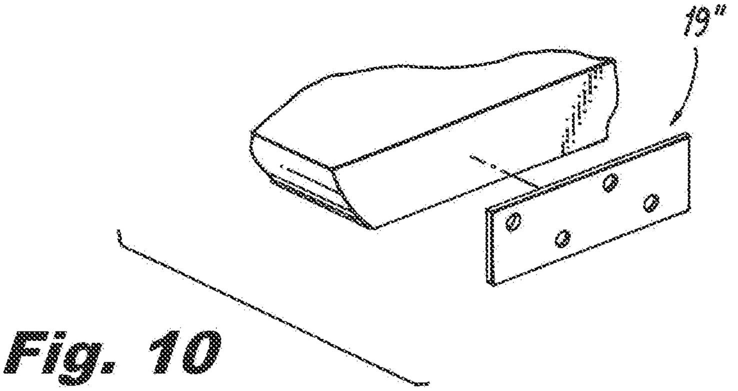
FIG. 10 is a perspective view of the indicia of the embodiment of FIG. 9.

FIG. 9 shows another alternative embodiment of sensor 18" and indicia 19". In this embodiment pins 182*a-h* are conductive and are electrically isolated from the bulk of the connecting portion 32. Pins 182*a-h* are coupled with electrodes that communicate electrical signals to controller 24. According to one embodiment, the controller 24 detects current flowing through selected ones of the pins into the bulk of head 14 when head 14 is connected with tool frame 30. The selected ones of the pins 182*a-h* that electrically connect with the bulk of the head 14 is determined by indicia 19" which are a pattern of insulating and non-insulating areas on the surface of head 14. According to one embodiment, shown in FIG. 10, an insulating decal 19' with an array of holes is provided on the surface of head 14. Selected pins 182*a-h* that align with the holes pass through the decal and electrically connect with the bulk of the head 14, allowing current to flow. Pins that do not align with holes are insulated from the head 14 and no current flows through those pins. The number and location of holes is selected to identify which type of head is connected with the main body 30. Controller 24 monitors which pins 182*a-h* conduct current (i.e., are not electrically insulated from head 14) and uses that information to identify the type of head 14 connected. As with the previous embodiment, controller 24 determines a proper force to apply based on the determined type of head.

Other types of sensors 18 and indicia 19 can also be used to allow controller 24 to identify the type of head 14 connected with the main body 30. For example, an RFID tag may be attached to the head 14 and an RFID reader may be provided on the main body 30.

Figure 14:
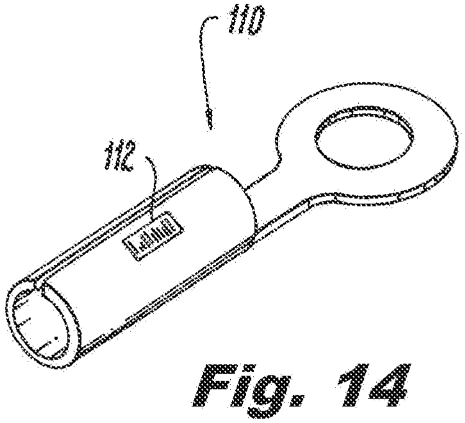
FIG. 14 is a perspective view of a lug connector according to an embodiment of the disclosure.

According to a further embodiment, controller 24 may also receive a signal from the die/connector sensor 21. Die/connector sensor 21 is located on the outer surface of tool 10. The die/connector sensor 21 may be a barcode sensor, such as the MT80 Mini Scan Engine manufactured by Marson Technology Co., Ltd. FIGS. 11, 12, and 13 show exemplary embodiments of dies used with the tool 10. Dies 100 includes indicia 102, such as a barcode pattern that may be applied as an adhesive label or etched or painted onto the die. FIGS. 14 and 15 show examples of a lug connector 110 and a splice 114, respectively used with the tool 10. Barcodes 112 and 122 are applied to a surface of the connector and splice identifying them by type.

In operation, a user places the barcode for the die 102 and/or connector 110, 114 to be used to perform a task so that it is readable by sensor 21. The user presses pushbutton 16. In response to the pushbutton press, controller 24 causes sensor 21 to read the barcode and send data indicating the type of die or connector back to controller 24. Controller 24 compares that data with information stored in memory 25 to identify the die and/or connector being used to perform a task. Once a die 100 is identified, the process is repeated to identify the connector 110, 114 or vice versa. The user then fits die 100 onto tool 10 by engaging an outer surface of the die with an inner surface of impactor 52 and anvil 54 of head 14. Based on the identified die and/or connector type, the controller 24 determines a force to be applied by hydraulic drive 28 based on information stored in memory 25.

According to one embodiment, controller 24 also monitors pushbutton 16 to allow a user to communicate to the controller certain information, such as the metal forming the conductor to be worked on for a task. According to one aspect, the user presses the button once to actuate the die/connector sensor 21, as described above. The user presses the button 16 twice in quick succession to indicate that the conductor being worked on is formed from copper. The user presses the button three times in quick succession to indicate that the conductor being worked on is aluminum. Controller 24 monitors pushbutton 16 to determine if the user has identified a particular metal and compares that information to information stored in memory 25 to determine a force to apply. According to one embodiment, if the user does not indicate a type of metal forming the conductor, a default metal type, e.g. copper, is assumed by controller 24 when determining the force to apply. According to a further embodiment, the user inputs other information about the conductor, such as the size of the conductor, by actuating the pushbutton or by another input means such as additional buttons, keypad, dial, or the like (not shown). This additional information is used by controller 24 to determine an appropriate force to apply.

In addition to, or in alternative to using a hydraulic pressure sensor 30 to monitor the force being applied to a workpiece, a load cell, strain gauge, or other force sensing device 17 may be used to directly sense the force being applied. As shown in FIGS. 4, 5, and 6, load cell 17 is positioned on a proximal-facing surface of T-shaped slot 36 on tool connecting portion 32 in contact with a distal-facing surface of upper arm 38 of head connecting portion 34. As shown in FIG. 2, load cell 17 is in communication with controller 24. In operation, controller 24 monitors the force measured by load cell 17. When that force reaches the appropriate force for the particular type of head, die, and/or connector, controller 24 turns off motor 18 and opens relief valve 29.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A hydraulic tool comprising:

a working head, the working head comprising head indicia that identify a type of the working head;

a tool frame having a piston;

a hydraulic system coupled to the piston;

a coupling mechanism, the coupling mechanism releasably coupling the working head to the frame and coupling the piston to a working surface of the working head;

a head sensor, the head sensor being adapted to detect the head indicia; and a controller connected with the head sensor and the hydraulic system, wherein the controller receives a signal generated by the head sensor in response to the detected head indicia, determines the type of the working head, determines a maximum force to apply to the working surface based at least in part on the determined working head type, and controls the hydraulic system to apply the maximum force.

2. The tool according to claim 1, further comprising a die, the die comprising die indicia that identify a type of the die, wherein the tool further comprises a die sensor connected with the controller, wherein the die sensor communicates to the controller the die type based on the die indicia, and wherein the controller determines the maximum force to apply based at least in part on the identified die type.

3. The tool of claim 2, wherein the die indicia comprise visible markings and wherein the die sensor is an optical sensor.

4. The tool of claim 3, wherein the visible markings comprise a bar code, a UPC code, or an alphanumeric character.

5. The tool according to claim 1, further comprising a connector sensor in communication with the controller, the connector sensor adapted to read a connector indicia of a connector indicating a type of the connector, and wherein the controller determines the maximum force based at least in part on the identified connector type.

6. The tool of claim 5, wherein the connector indicia comprise visible markings and wherein the connector sensor is an optical sensor.

7. The tool of claim 6, wherein the visible markings comprise a bar code, a UPC code, or an alphanumeric character.

8. The tool according to claim 1, further comprising an input device connected with the controller, the input device adapted to receive an input indicating a characteristic of a workpiece, and wherein the controller determines the maximum force based at least in part on the characteristic.

9. The tool according to claim 8, wherein the characteristic is a type of metal comprising the workpiece.

10. The tool of claim 1, wherein the head indicia comprise visible markings and wherein the head sensor is an optical sensor.

11. The tool of claim 10, wherein the visible markings comprise a bar code, a UPC code, or an alphanumeric character.

12. The tool of claim 1, wherein the head sensor comprises an array of mechanical switches in signal communication with the controller and positioned to contact an indicia surface of the head and wherein the head indicia comprise an array of actuators on the indicia surface positioned to operate selected ones of the switches to indicate the head type.

13. The tool of claim 1, further comprising a pressure sensor in signal communication with the controller and in fluid communication with the hydraulic system and adapted to send a signal indicating a pressure in the hydraulic system, wherein the controller determines a current force based on the pressure, and wherein the controller compares the current force with the maximum force.

14. The tool of claim 1, further comprising a force sensor in signal communication with the controller and adapted to monitor a current force applied by the head on a workpiece and send a signal to the controller indicating the current force, wherein the controller compares the current force with the maximum force.

15. The tool of claim 14, wherein the force sensor is a load cell or strain gauge.

16. A method of deforming a workpiece comprising the steps of:

selecting a working head of a head type, the working head having a head indicia identifying the selected head type;

providing a tool frame, the tool frame comprising;

a hydraulic system;

a piston connected with and driven by the hydraulic system;

a head sensor adapted to detect the head indicia;

a controller adapted to control the hydraulic system, wherein the controller is in signal communication with the head sensor and the hydraulic system and wherein the controller detects a current force applied by the hydraulic system;

connecting the head with the tool frame and connecting the piston to a working surface of the head;

determining, by the controller based on the signal from the head sensor the selected head type and a maximum force to apply based, at least in part on the selected head type;

arranging a workpiece in the working head;

energizing the hydraulic system to move the piston to drive the working surface toward the workpiece;

monitoring the current force applied by the hydraulic system;

determining that the current force is equal to or greater than the maximum force; and deenergizing the hydraulic system.

17. The method of claim 16, further comprising:

selecting a die of a die type from a plurality of die types, the die having a die indicia identifying the selected die type;

providing on the tool frame a die sensor in signal communication with the controller adapted to detect the die indicia;

activating the die sensor to detect the selected die type;

connecting the selected die with the working head, the die providing the working surface;

determining, by the controller based on the signal from the die sensor the selected die type and the maximum force to apply based, at least in part on the selected die type.

18. The method of claim 16, further comprising:

selecting a connector of a connector type from a plurality of connector types, the connector having a connector indicia identifying the selected connector type;

providing on the tool frame a connector sensor in signal communication with the controller adapted to detect the connector indicia;

activating the connector sensor to detect the selected connector type;

applying the selected connector to a conductor, the connector and conductor comprising the workpiece;

determining, by the controller based on the signal from the die sensor the selected connector type and the maximum force to apply based, at least in part on the selected connector type.

19. The method of claim 16, further comprising:

selecting a conductor, formed from a material;

providing on the tool frame an input device in signal communication with the controller, the input device adapted to provide a signal to the controller indicating the material;

actuating the input device to indicate the material;

determining, by the controller based on the signal from the input device, the material and the maximum force to apply based, at least in part on the material.

* * * * *